(12) United States Patent
Todd et al.

(10) Patent No.: US 6,233,730 B1
(45) Date of Patent: May 15, 2001

(54) REVISION COMPATIBILITY BETWEEN PROGRAMS

(75) Inventors: Stephen Todd, Shrewsbury; David Spencer, Northboro; Andreas Bauer, Acton; David DesRoches, Methuen, all of MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 09/213,073

(22) Filed: Dec. 16, 1998

(51) Int. Cl.[7] .................................................. G06F 9/445
(52) U.S. Cl. ......................................... 717/4; 717/4
(58) Field of Search ....................................... 717/4

(56) References Cited

U.S. PATENT DOCUMENTS

| | | | |
|---|---|---|---|
| 5,684,985 | * 11/1997 | Ahmadi | 395/611 |
| 5,913,065 | * 6/1999 | Faustini | 395/703 |
| 6,044,218 | * 3/2000 | Faustini | 395/702 |
| 6,049,832 | * 4/2000 | Brim et al. | 709/237 |
| 6,092,077 | * 6/2000 | Ahmadi | 707/102 |

* cited by examiner

*Primary Examiner*—Mark R. Powell
*Assistant Examiner*—Michael B. Holmes
(74) *Attorney, Agent, or Firm*—Bromberg & Sunstein LLP

(57) ABSTRACT

Program revision compatibility in an object-oriented environment is provided operating between a first and a second program. The first program has a parent object with an initial group of fields and an inherited child object with an initial group of fields. In one embodiment, an expansion descriptor is established in the first program which provides a data storage location for data of a new field. The data of the new field is sent to the data storage location of the expansion descriptor and a child object identifier is associated with the data of the new field in the expansion descriptor. The expansion descriptor is sent to the second program along with object information of the child object corresponding to the initial group of fields. The second program recognizes the expansion descriptor and may update a corresponding child object of the second program regardless of whether the second program has been updated with the new field.

23 Claims, 6 Drawing Sheets

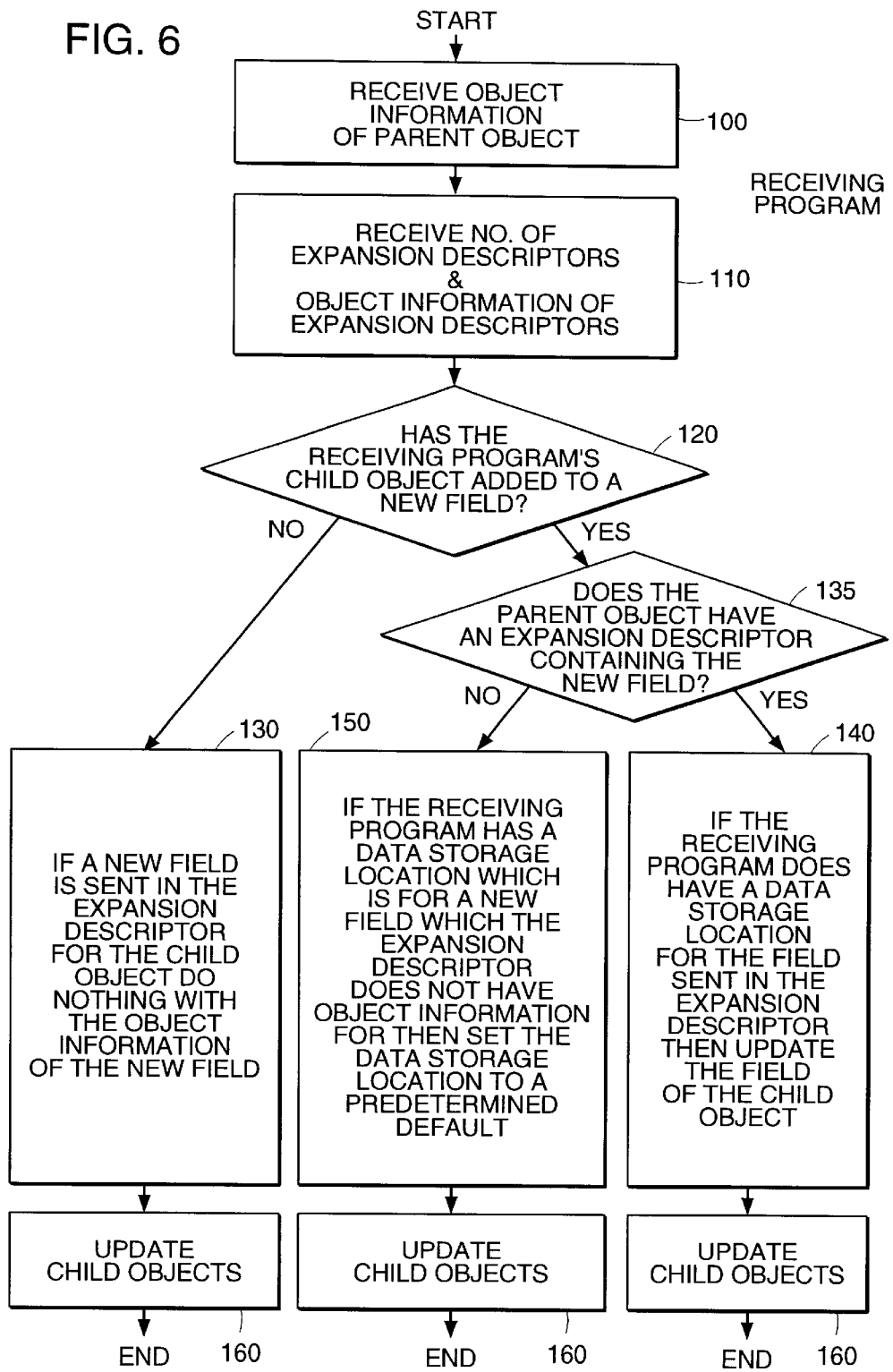

REVISION COMPATIBILITY BETWEEN PROGRAMS

FIELD OF INVENTION

This invention relates to computer programs, and more particularly to revision compatibility between programs.

BACKGROUND ART

Client/server network operating systems allow networks to centralize functions and applications in one or more dedicated servers. The server becomes the heart of the system providing access to resources by individual client programs. In an object-oriented environment the server may store objects. An object is a self-contained entity that consists of both data and functions to manipulate the data. Objects may be either parent objects or child objects where child objects inherit the data structure of the parent object and add additional data elements or functions.

In an object-oriented client/server network the objects that are on the server are managed by server software which responds to requests for objects from client software that request access to the object information. A client wishing to retrieve information from an object on the server makes a request, which is sent using common network streaming techniques to the server software. The server software responds by accessing the requested object. The server software streams the object to the client by sending the parent object and all of the child objects in a particular order known to the client. This system of streaming data works so long as the client and the server are both aware of the parent object, all inherited child objects, and all of the fields of the inherited objects that are being streamed along with the order of the data being streamed. Whenever the client software or the server software is upgraded to a new version in which new fields have been added within either a child or parent object, the non-updated software may lose data or malfunction because the data being sent is not expected and therefore the receiver is not capable of parsing the data. One solution that may be implemented is that of revision locking. Revision locking causes a program which has a different revision identifier from the program which it is either sending or receiving object information to be locked so that no data is exchanged. This is overly restrictive when only minor modifications have been made between different versions of software.

SUMMARY OF THE INVENTION

The present invention is directed to a method for providing program revision compatibility in an object-oriented environment. The method operates between a first and a second program. The first program has a parent object with an initial group of fields and an inherited child object with an initial group of fields. In one embodiment, an expansion descriptor is established in the first program which provides a data storage location for data of a new field. The expansion descriptor may be created in the parent object of the first program. The data of the new field is sent to the data storage location of the expansion descriptor and a child object identifier is associated with the data of the new field in the expansion descriptor.

The expansion descriptor is sent to the second program via a data stream and data associated with a child object corresponding to the child object identifier is sent via the data stream. In an alternative embodiment the expansion descriptor may be sent to a corresponding parent object of the second program.

On the receiving side the second program receives a data stream including the expansion descriptor. The data stream is parsed by the second program and the expansion descriptor is stored in the second program. The expansion descriptor may be stored in the corresponding parent object of the second program. The second program identifies the child object identifier in the expansion descriptor in the second program and identifies the data associated with a new field in the expansion descriptor.

The second program then may perform one of three steps depending on the differences between the first and second programs. The second program may update a new field of a child object of the second program corresponding to the child object identifier if the data structure of the corresponding child object of the second program has a data storage location for the new field. The second program may set a data storage location for a new field in a corresponding child object of the second program to a default if in the step of identifying the data associated with the new field in the expansion descriptor there is no new field data in the expansion descriptor corresponding to the new field in the corresponding child object of the second program. The second program may ignore the data associated with the new field in the expansion descriptor located in the second program if the data structure of the corresponding child object of the second program does not have a data storage location for the data associated with the new field.

In another embodiment of the invention a data arrangement of object-oriented computer code on a computer readable medium for updating of objects between a first program and a second program may be formed. The data arrangement includes a parent object a child object having a new field and an expansion descriptor located in the parent object comprising a variable length data storage location for storage of new field data that is associated with the child object and a child object identifier. The method and data arrangement as described may be embodied on a computer readable medium.

BRIEF DESCRIPTION OF THE DRAWINGS

The foregoing features of the invention will be more readily understood by reference to the following detailed description taken with the accompanying drawings:

FIG. 6 is a flow chart of the steps taken by a second program receiving object information from a first program in one embodiment of the invention.

DETAILED DESCRIPTION OF SPECIFIC EMBODIMENTS

Object-oriented programming refers to a special type of programming that combines data elements with functions to create re-usable objects. In this way, the data structure becomes an object that includes both data and subroutines. In addition, programmers can create relationships between one object and another. For example, objects can inherit characteristics from other objects. This is known as inheritance such that a child object can inherit a data structure from a parent object. A parent object may also be referred to as a base class, for example, if C++ programming language is used for coding, where child objects are inherited classes of the base class. In the description and the claims that follow, the term "object information" refers to the data which is stored within an object.

For the purposes of the description and the claims that follow the term "data structure" shall refer to an organized format in which data is held together. A data structure includes the structure of an object including all fields that hold data and all subroutines of the object. The term "corresponding" when referred to an object means that the initial data structure of an object is the same as the initial data structure of another object. For example, two programs may have corresponding parent objects which initially have identical data structures. An "updated" version of a computer program is a new version of the program in which an object has at least one additional field added which adds to the initial data structure of the object. A "field" is either a data storage location or procedure/function. For the purposes of the description herein and the claims that follow it, unless the context otherwise requires, the terms "client software" and "server software" may be interchanged such that the client software and the server software perform the same essential functions of accessing objects and sending objects. In the description and the following claims the terms "client software" and "server software" shall refer to computer programs that are located on either a client computer or a server computer respectively along with all objects that are resident on the client computer or the server computer respectively. Likewise, the terms "first program" and "second program" refer to the program code and all associated objects of that program code.

Figure 1:
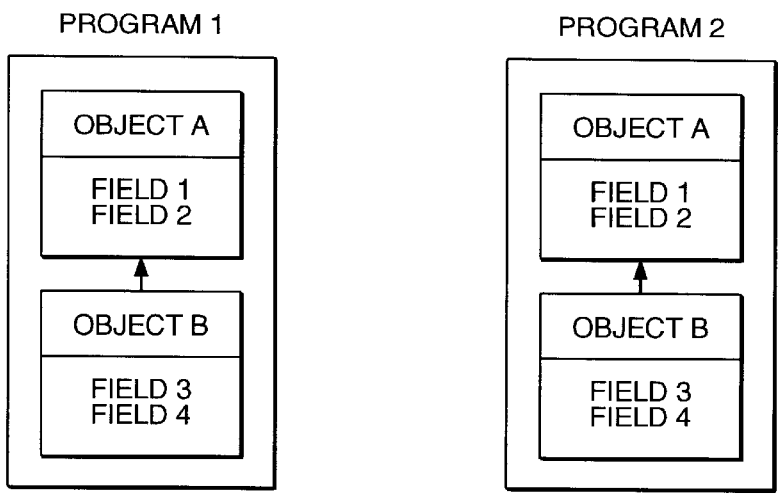
FIG. 1 is a block diagram of two programs having the same parent and child object data structures.

FIG. 1 shows a block diagram of two programs, program 1 and program 2, both of which initially contain parent objects having identical data structures. Program 1 and program 2 may exist in memory of a computer where data is exchanged through a common file or memory, may be located on a computer-readable disk or may exist on two separate computers, such as two computers connected in a network. The parent objects are represented by object A in both programs 1 and 2. The two programs also initially contain child objects having identical data structures. Each child object inherits from the parent object. The child objects are represented by object B in programs 1 and 2. Object A contains two fields, field 1 and field 2 and object B also contains two fields, field 3 and field 4. The programs of this embodiment operate together to transfer object information between the two programs. The transfer of information may occur in one of three situations. The first situation occurs when one program has a specific request to make of the second, and in doing so sends a special request object to the second program. The second situation is when, in response to such a request, the second program sends to the first program a list of all objects present in the second program. The third situation is when, in response to a request from the first program, the second program sends only those objects which have been updated and about which the first program has requested. The three situations illustrate that objects may be transferred between programs in either direction.

Figure 1A:
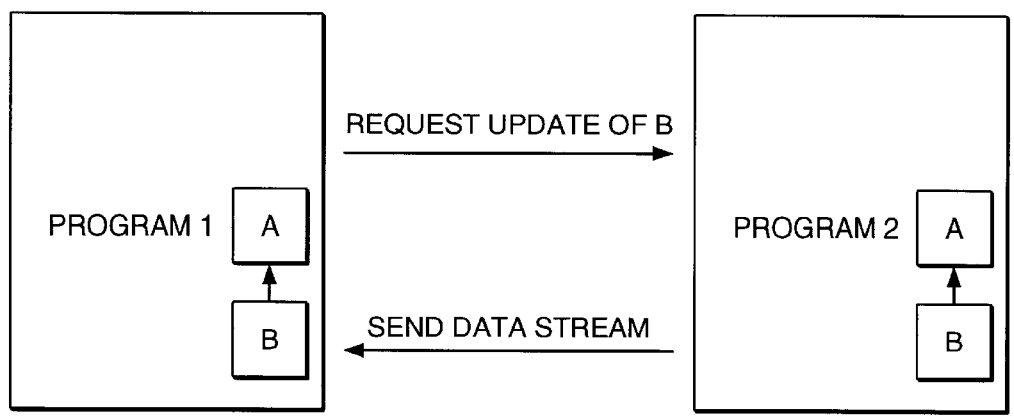
FIG. 1A is a block diagram showing the two programs of FIG. 1 communicating.

FIG. 1A shows a polling request by program 1 for an update of the fields of object B. The request is received by program 2 which retrieves the requested objects and then sends streaming data across to program 1. Program 2 first sends the object identifier for the parent object, and then object A's fields, field 1 and field 2. Next, program 2 streams object B's identifier followed by its two fields, field 3 and field 4. The information is received by program 1 and object A and B are updated in program 1. Because the information is sent in order of inheritance and both programs know the data structure of the objects and fields of the objects, the data stream may contain no header information within the object information data stream. Header information is any information other than the actual data which gives information about the data such as indicating the size of the next data field to parse. Since the information may be sent without this header information, the stream is of a smaller length than with the header information. As the data stream is received it is parsed according to the known data structure of the object and the known order of the object information that is being sent.

Figure 2:
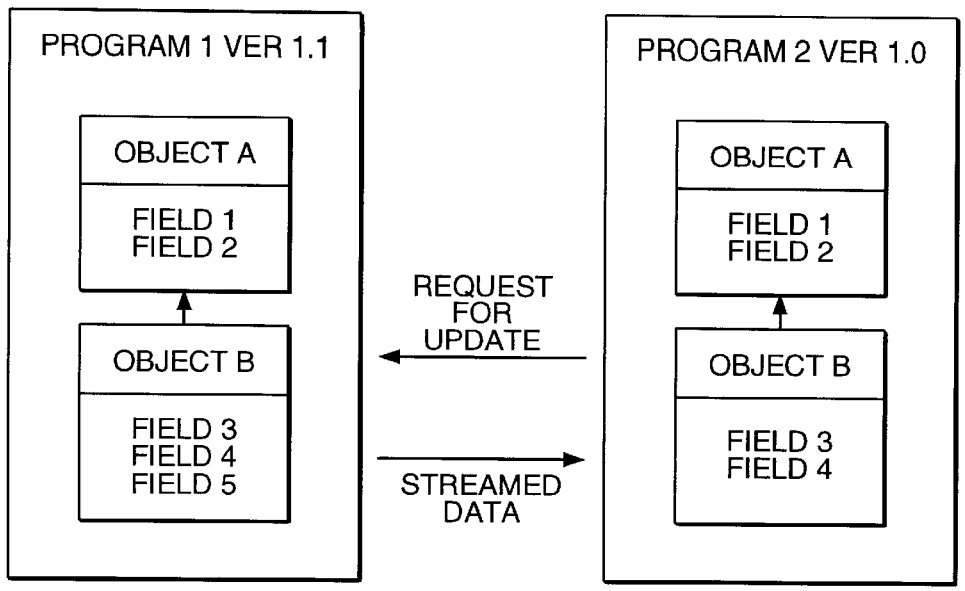
FIG. 2 is a block diagram showing two programs communicating where one program is of a different version than the other.
Figure 2A:
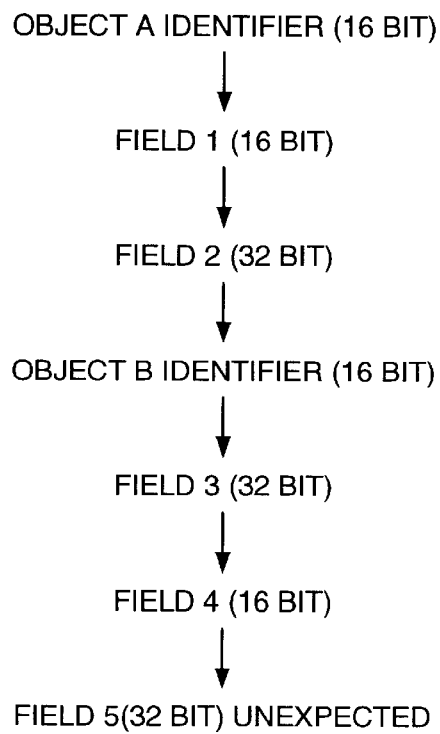
FIG. 2A is a flow chart showing the order of object information being transferred between the programs in FIG. 2.

As the software develops, new versions may add fields to existing objects such as updating object B to include a field 5 in program 1 as shown in FIG. 2. As new fields are added the program is given a new version identifier, for example program 1 is given ver 1.1 up from the initial version, ver 1.0. If data is then sent between updated program 1 (ver. 1.1) and program 2 (ver 1.0) which is not updated, program 2 may crash or lose important data due to the program's inability to correctly parse the data as a result of the change to the expected data flow. As can be seen in FIG. 2A the data that is streamed across from program 1 to program 2 is first the object identifier for object A, followed by field 1 and field 2 and then object identifier B followed by field 3,4, and 5. Program 2 does not expect the last 32 bits of streamed data which corresponds to field 5 of object B. In a networking application, this data may be left in the networking buffer and never accessed by program 2, or cause program 2 to respond improperly. Program 2 expects only 128 bits of data, yet it receives an additional 32 bits which it does not know how to handle. To solve this problem an expansion descriptor is added to programs that are updated. An expansion descriptor provides a data storage location to store data related to new fields associated with an object. While old versions of a program may be familiar with new fields added in newer versions of a program, all versions of a program written in accordance with an embodiment of the invention will understand expansion descriptors even if that amounts to recognizing the expansion descriptor in the data stream, parsing the expansion descriptor from the data stream and providing a data storage location for the expansion descriptor.

Figure 3:
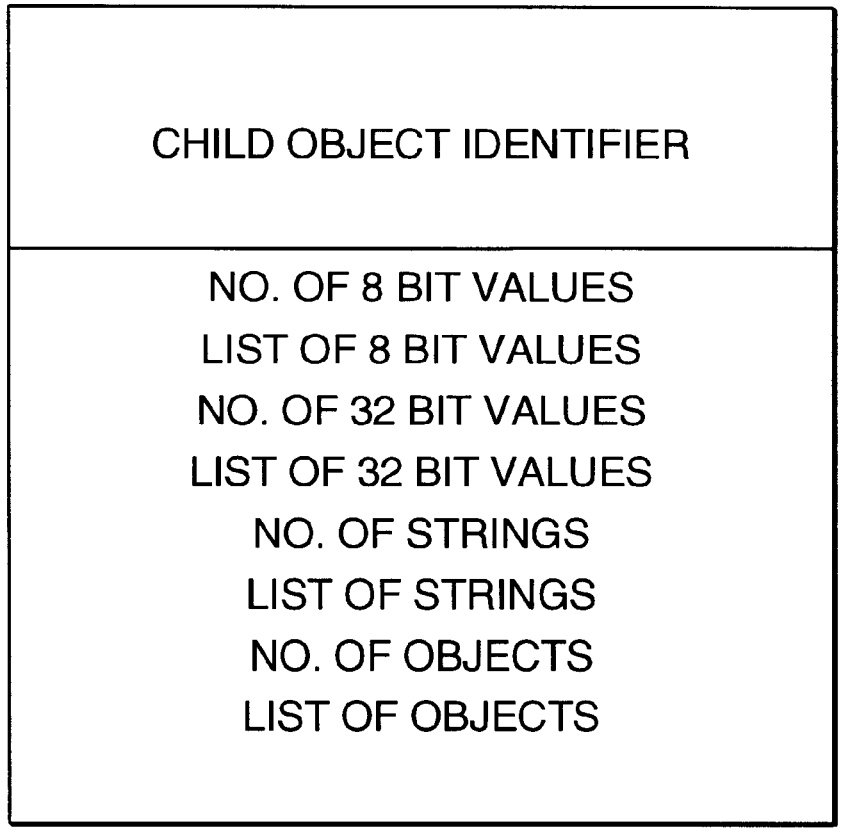
FIG. 3 is a block diagram showing a preferred embodiment of an expansion descriptor.

In a presently preferred embodiment, the expansion descriptor for a new field is formed in a parent object when object information of the child object has been requested to be sent to another program. In alternative embodiments, the expansion descriptor may be created in other parts of the program and is not limited to creation in a parent object. The parent object or program location for holding expansion descriptors is specifically identified as an object location for performing the function of holding an expansion descriptors. Additionally, in other embodiments, the expansion descriptor may be created prior to a request for the object information of the child object to be sent, such as, upon addition of a new field to the child object. In the presently preferred embodiment, when a request to update the child object is received by program 1, where program 1 has field 5 added to object B, the child object calls a function in the parent object, object A, which is available only to the child object (s). Through parameters in that function, the child object communicates new information to the parent object. This information includes the child object identifier, the data type and size, and the data value. When the parent object receives this information it allocates an expansion descriptor and stores all of this information within it as shown in FIG. 3. In a preferred embodiment, the expansion descriptor contains a reference to the child identifier, along with a list of 8 bit values, a list of 32 bit values, a list of strings and a list of objects. The information that is sent by the updated child object to the expansion descriptor and stored within the expansion descriptor may be changed and is application specific. Should the same child object add another field, it will be added to the same expansion descriptor. If any other child objects have new fields the same procedure is followed in which each child object has its own expansion descriptor present in the parent object. Once all of the child objects have stored all new fields in their respective expansion descriptors in the parent object, the parent object and all of its children can be sent to the program requesting the updated information.

Figure 4:
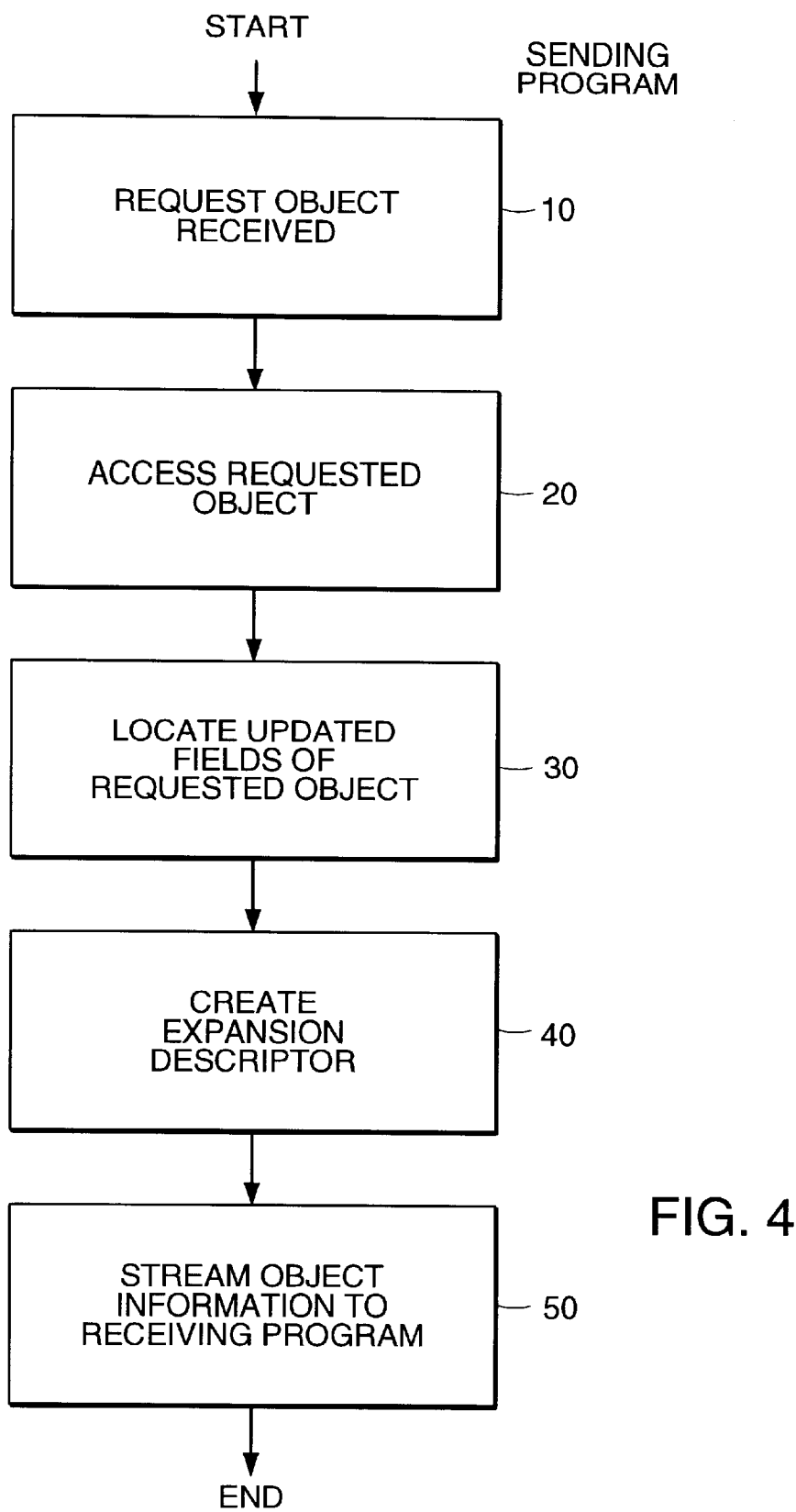
FIG. 4 is a flow chart of the steps taken by a first program sending object information to a second program in one embodiment of the invention.
Figure 5:
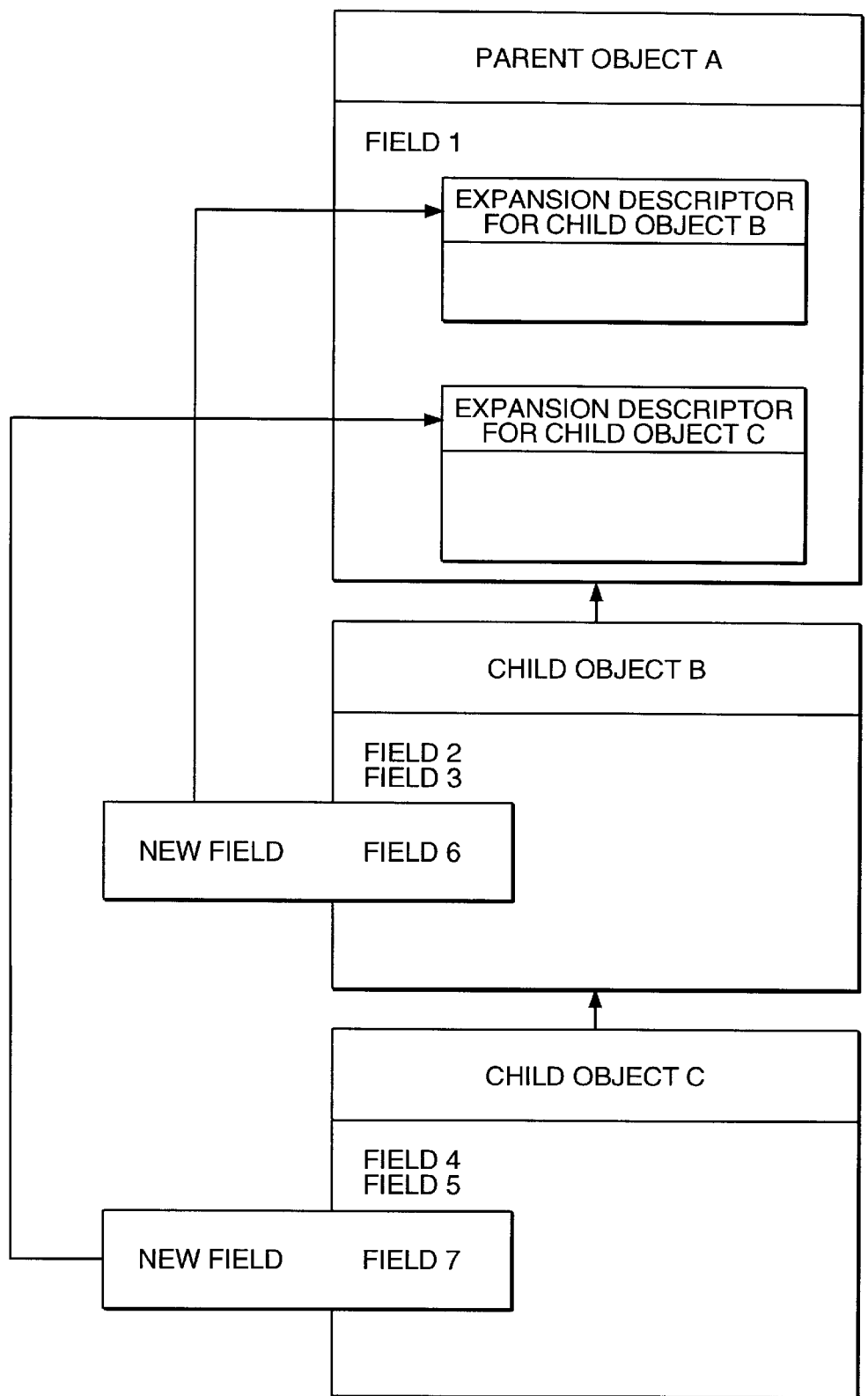
FIG. 5 is a block diagram showing one embodiment of the invention for creating expansion descriptors in a parent object as the result of child objects having new field added to the child objects' data structure.

FIG. 4 shows a flow chart of the steps that occur in the sending program when the sending program receives a request for an object update. First the receiving program streams a request object to the sending program. This request object contains instructions detailing which object the receiver is interested in (step 10). The sending program, once it has identified which object to send, prepares the object to stream to the receiver by accessing the object. (step 20). The child objects in this object first pass information about new fields up to the parent object (step 30). FIG. 5 shows the new fields in field 6 of child object B and field 7 of child object C being passed up to parent object A and an expansion descriptor being created by the parent object for child object B and child object C to store the data of the new fields (step 40). Once all of the child objects have been updated, the parent object and the expansion descriptors have been created, the object information of the parent object is streamed to the receiving program including any fields of the parent object and all expansion descriptors by a send function of the child object (step 50).

The sending program, program 1, then sends all subsequent child objects and fields of the child objects that were in the original data structure of the program in a predetermined order which is known to the receiver. In the presently preferred embodiment the order is in order of inheritance. The send function of the child object knows which fields have been added subsequent to the initial version (ver 1.0) of the program and does not send this information since it has already been sent to the receiver program in the expansion descriptor which is part of the parent class. In a preferred embodiment, the sender program is so equipped to send only the object information of those fields of the child objects which existed in the initial data structure.

FIG. 6 shows the steps taken by the receiving program as object information is received. First, the object information is received by the receiving program, in streaming fashion. The object identifier and object information of the parent object is received. The parent object is identified by the parent object's identifier (step 100). Upon receiving an object identifier from an object that can hold expansion descriptors, the receiving program next expects to receive the number of expansion descriptors followed by the data of the expansion descriptors (step 110). The expansion descriptor becomes the one place within the streamed object information where header information is required in addition to the actual data, since there can be a variable amount of expansion descriptors sent depending on the number of child objects that are updated during a program revision of the sending program and a variable amount of fields updated within each child object. The receiving program recognizes the data structure of the expansion descriptor and is capable of parsing the information since the data structure of the expansion descriptor is known and it is composed of known data types, such as integers, and strings. In the presently preferred embodiment, the order of the information sent in the expansion descriptor is: the child object identifier, then the number of 8 bit integers followed by the data of the 8 bit values, followed by the number of 32 bit values followed by the actual 32 bit values, then the number of strings followed by the strings' data, and finally the number of objects followed by the object information as shown in FIG. 3.

After the parent object has received the expansion descriptors, the child object either does not recognize the new fields because the child object is of an original version and only recognizes the fields within the initial data structure, or the child object understands that new fields have been added (step 120). If the child object is of an original version, the child object does nothing with the expansion descriptor located in the parent object (step 130). In an alternative embodiment in which an expansion descriptor is created for every child object and sent to the receiving program, the child object of the receiving program may ignore the new field in the expansion descriptor which the child object does not have a data storage location for. The term ignores connotes that first, the child object of the receiving program recognizes that a field exists in the expansion descriptor and second that the child object recognizes that there is no field in the child object of the receiving program in which the field in the expansion descriptor should be placed.

If the child object recognizes that a new field has been added, the child object then contacts the parent object to see if it has an expansion descriptor containing the new field (step 135). If the parent does contain an expansion descriptor containing the new field, the child object retrieves the new field from the expansion descriptor and stores it within the child object (step 140). If the parent object does not contain an expansion descriptor containing the new field, then the receiving program is a newer version than the sending program. Therefore the receiving program executes a function which will fill in any empty fields with predefined default values (step 150).

After the object information of all of the expansion descriptors are addressed the remaining object information of the child objects may be streamed in and the child objects of the receiving program may be updated (step 160).

In another embodiment the expansion descriptor may be implemented in a client and server program configuration in a network where the server stores objects and the client requests information concerning those objects. Expansions descriptors may be implemented preferably in data storage management software in a client server program configuration. In data storage management software, the server creates an object-oriented representation of a storage device such as a disk array. For example, a storage device may have objects representing a cabinet, a fan, a power supply storage processors, memory or any combination where one object is a child object of another. In the storage management software, there may be many client programs which are running and which require updates on the status of the disk array from the server software through the object representation of the disk array. Expansion descriptors may be created and used, as described above, between any client program and the server program as child objects are updated with new fields. Using the method described above in combination with the expansion descriptors, a system is provided whereby multiple client programs each being of a different version may communicate with a server of any version.

In an alternative embodiment, the disclosed apparatus and method for revision compatibility of computer programs may be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention. These and other obvious modifications are intended to be covered by the appended claims.

What is claimed is:

1. A method for providing program revision compatibility in an object-oriented environment having a first program having a parent object with an initial group of fields and an inherited child object with an initial group of fields and a second program, the method comprising:

establishing an expansion descriptor in the first program providing a data storage location for data of a new field;

sending the data of the new field to the data storage location of the expansion descriptor; and associating a child object identifier with the data of the new field in the expansion descriptor.

2. The method according to claim 1, further comprising the step of:

sending the expansion descriptor to the second program via a data stream.

3. The method according to claim 2, further comprising the step of:

sending data associated with a child object corresponding to the child object identifier to the second program via the data stream.

4. A method according to claim 2, wherein the step of sending comprises sending the expansion descriptor to a corresponding parent object of the second program.

5. A method for providing program revision compatibility in an object-oriented environment having a first program having a parent object with an initial group of fields and an inherited child object with an initial group of fields and a second program, the method comprising:

receiving a data stream in the second program including an expansion descriptor; and parsing the expansion descriptor from the data stream in the second program.

6. The method according to claim 5, further comprising the steps of:

identifying the child object identifier in the expansion descriptor in the second program; and identifying the data associated with a new field in the expansion descriptor in the second program.

7. The method according to claim 5 further including the steps of setting a data storage location for a new field in a corresponding child object of the second program to a default there is no new field data in the expansion descriptor corresponding to the new field in the corresponding child object of the second program.

8. The method according to claim 5, further comprising:

storing the expansion descriptor in the second program.

9. The method according to claim 6, further including the step of updating a new field of a child object of the second program corresponding to the child object identifier if the data structure of the corresponding child object of the second program has a data storage location for the new field.

10. The method according to claim 6, further including the step of ignoring the data associated with the new field in the expansion descriptor located in the second program if the data structure of the corresponding child object of the second program does not have a data storage location for the data associated with the new field.

11. A method according to claim 8, wherein the step of storing, storing the expansion descriptor in the corresponding parent object of the second program.

12. A method according to claim 1 further comprising storing the expansion descriptor in the parent object of the first program.

13. A data arrangement of object-oriented computer code on a computer readable medium for updating of objects between a first program and a second program, the data arrangement comprising:

a parent object;

a child object having a new field; and an expansion descriptor located in the parent object comprising a variable length data storage location for storage of new field data that is associated with the child object and a child object identifier.

14. A method of arranging data in an object-oriented computer code for updating objects between a first program and a second program, the method comprising:

adding a new field to a child object altering an initial data structure of the child object; and storing new field data in an expansion descriptor which is not located within the child object comprising a variable length data storage location.

15. A method of arranging data according to claim 14, wherein the step of storing the new field data in an expansion descriptor the expansion descriptor is stored in a parent object from which the child object inherits.

16. A computer program on a computer readable medium, the computer program comprising:

computer code for creating an expansion descriptor after a new field is added to a child object;

computer code for storing new field data of the child object into the expansion descriptor and associating a child object identifier with the new field data.

17. A computer program according to claim 16, wherein the expansion descriptor is created within a parent object from which the child object inherits.

18. A computer program according to claim 17, further comprising:

computer code for sending the expansion descriptor to another program.

19. A computer program on a computer readable medium, the computer program comprising:

computer code for parsing new field data of a child object from a received expansion descriptor based on a child object identifier which is associated with a new field.

20. A computer program according to claim 19, further comprising:

computer code for updating the new field of the corresponding child object in the computer program if the computer program contains a data storage location for new field data within the corresponding child object.

21. A computer program according to claim 19, further comprising:

computer code for updating a new field of the child object in the computer program to a default value if the received expansion descriptor does not contain new field data for the new field.

22. A computer program according to claim 19, further comprising:

computer code for ignoring the new field associated with the child object identifier if the computer program does not have a data storage location for the new field within the corresponding child object.

23. A computer program according to claim 19, further comprising:

computer code for setting an updated field of the child object in the computer program to a default value if no expansion descriptor is received.

* * * * *

UNITED STATES PATENT AND TRADEMARK OFFICE
CERTIFICATE OF CORRECTION

PATENT NO. : 6,233,730 B1
DATED : May 15, 2001
INVENTOR(S) : Stephen Todd, David Spencer, Andreas Bauer, and David DesRoches It is certified that error appears in the above-identified patent and that said Letters Patent is hereby corrected as shown below:

Column 8,
Line 24, the first instance of "the" should be -- a --
Line 32, insert -- if -- after "default"
Line 52, delete the second instance of "storing"
Line 52, insert -- is stored -- after "descriptor"
Line 61, insert -- in the first program -- after "object"
Line 62, insert -- in the first program, the child object -- after "object"
Line 65, insert -- new field of the -- after "the"
Line 66, insert -- , the expansion descriptor being used to update a corresponding child object in the second program when the second program is of the same revision -- after "identifier"

Signed and Sealed this

Twenty-seventh Day of November, 2001

*Attest:*

NICHOLAS P. GODICI
*Attesting Officer*     *Acting Director of the United States Patent and Trademark Office*